Figure 1:
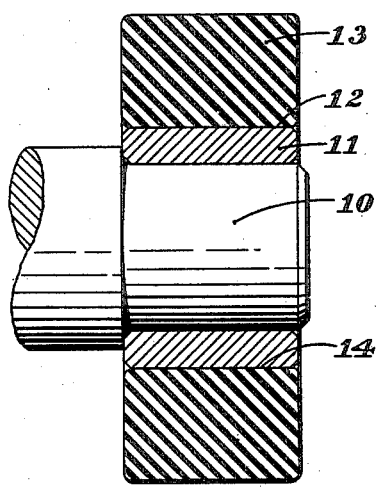

Jan. 12, 1943.  T. E. D. BILDE  2,307,874
PROCESS AND APPARATUS FOR MANUFACTURING BEARINGS
Filed Jan. 20, 1939  2 Sheets—Sheet 1

INVENTOR.
Tord Erik Daniel Bilde
BY Arthur G. Prangley
ATTORNEY.

Jan. 12, 1943.   T. E. D. BILDE   2,307,874
PROCESS AND APPARATUS FOR MANUFACTURING BEARINGS
Filed Jan. 20, 1939   2 Sheets-Sheet 2

INVENTOR.
Tord Erik Daniel Bilde
BY Arthur G. Rangley
ATTORNEY.

Patented Jan. 12, 1943

2,307,874

UNITED STATES PATENT OFFICE 2,307,874

PROCESS AND APPARATUS FOR MANUFACTURING BEARINGS

Tord Erik Daniel Bilde, Stockholm, Sweden
Application January 20, 1939, Serial No. 251,924
In Sweden January 25, 1938

11 Claims. (Cl. 18—42)

This invention relates to sleeve bearings and a process and apparatus for manufacturing them, and more particularly, to bearings consisting of one part of metal and another part of non-metallic material.

Sleeve bearings have been manufactured heretofore in two parts having complementary bearing surfaces with one member of the bearing being formed by casting or molding it about the other member. Formerly, these bearings have been made by molding or casting an inner ring of non-metallic material between the shaft and an outer metallic ring. The inner ring usually consists of an annular metal part with an outer covering of plastic material provided with an outer bearing surface engaging the inner bearing surface of the outer ring. The inner annular metal part is fixed to the plastic material by radial projections entering recesses provided in the plastic covering. The main purpose of the projecting parts of metal is to reduce the expansion of the inner non-metallic ring upon a temperature rise and the resultant binding of the outer metallic ring thereon. It is well known that the coefficients of expansion of non-metallic materials, such as synthetic resins, phenolic condensation products, and similar plastic material are larger than those of steels or other metals. Therefore, upon a rise in temperature, the greater expansion of the inner ring of plastic material, would greatly reduce the play between it and the outer ring of metallic material, even though there was no actual binding of the parts. Also, the plastic material is frequently of a non-homogeneous composition and the expansion is not uniform in all directions. The necessary play between the bearing surfaces of the two rings is often obtained by the shrinking of the plastic material as it cools after molding. As a result of the above facts, the former bearings of this type have not been satisfactory and could not be made with precision to insure the necessary oil film between the bearing parts. Also, the bearings of this type are very costly to manufacture.

This invention contemplates a process and apparatus for manufacturing a bearing of this type of the highest possible precision and avoiding the many drawbacks of former bearings of this type. The proper amount of play between the bearing surfaces is assured, in accordance with this invention, by means of a relative movement imparted to the two parts of the bearings during the casting operation. This play may also be obtained by the provision of a temporary coating of oil on the bearing surfaces during the casting. This relative movement of the two parts of the bearing during the process of forming the ring of non-metallic material compresses the non-metallic material and produces a homogeneous material with a smooth bearing surface. This compressing action is produced by an eccentric or planetary movement or simply by a vibration produced during the forming operation. In accordance with this process, bearings can be produced as an indivisible unit. The bearing surfaces, if desired, can be made cylindrical, spherical, or in any other suitable shape.

The material of the cast or molded member may be formed, for example, of a synthetic resin, babbitt, glass, sintered metal powder, certain wood or textile product, or bronze or the like. The important thing is that the material is plastic and can be shaped, preferably by the application of pressure or by pressure and heat.

In the accompanying drawings, a number of embodiments in accordance with this invention are shown more or less diagrammatically, as well as an embodiment or arrangement for carrying out the process according to this invention.

Figure 2:
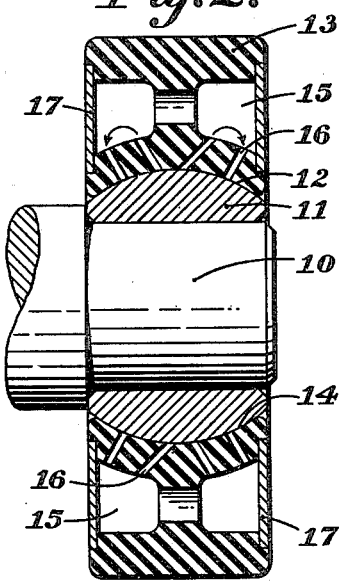
Figure 3:
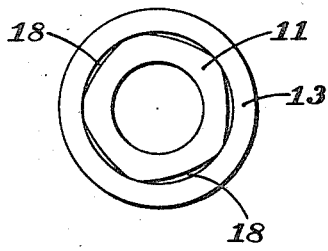
Figure 4:
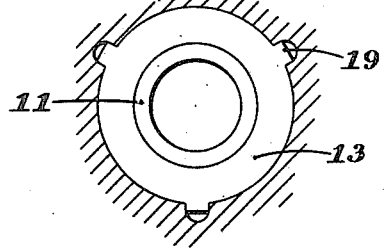
Figure 10:
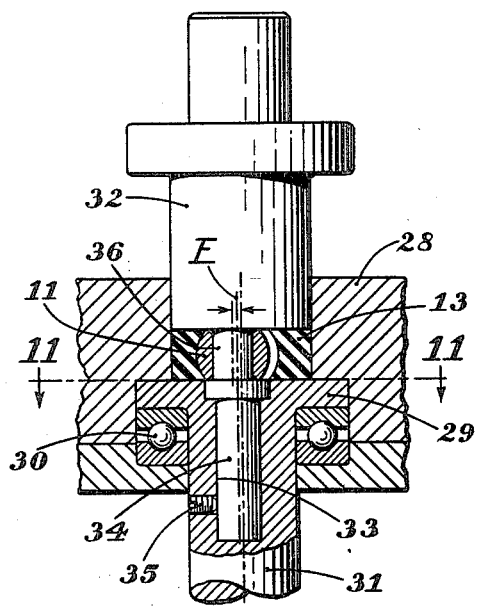
Figure 11:
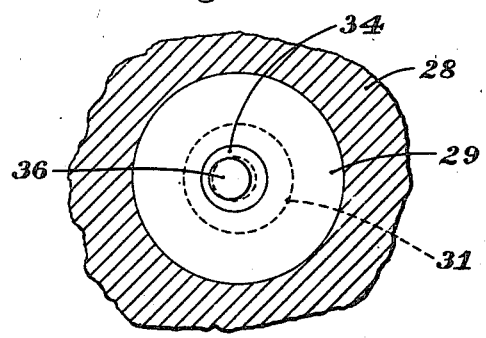

What I consider to be novel and my invention may be better understood by reference to the following specification and appended claims when considered in connection with the accompanying drawings, in which Fig. 1 shows a section of a cylindrical bearing;
Fig. 2 shows a section of a spherical bearing;
Fig. 3 shows an end view of a slightly different embodiment;
Fig. 4 shows an end view of a further embodiment;
Figs. 5–9 show sections of six additional embodiments given by way of example;
Fig. 10 shows diagrammatically a section of apparatus for carrying out the process; and
Fig. 11 shows a section along the line 11—11 of Fig. 10.

In the various figures the same numerals are used to designate similar parts. The numeral 10 indicates a shaft on which an inner ring 11 of the bearing is firmly attached, as for example by press fitting or the like. In Fig. 1, this inner ring 11 is cylindrical and provided with a bearing surface 12. An outer ring 13 surrounds the inner ring 11 and has a bearing surface 14. In this embodiment, the inner ring 11 is made of steel or similar material, and the outer ring 13 is made of a plastic material, such as, for example, a phenolic condensation product and formed by molding or casting.

The embodiment shown in Fig. 2 differs from the one described above, mainly in that the bearing surfaces 12 and 14 of the rings 11 and 13 are spherical. In the outer ring 13, pockets 15 for containing lubricating material are provided. Channels 16 connect the pockets 15 with the bearing surface 14. As indicated in the drawings, these channels 16 extend to the bearing surface 14 at different radial distances from the center line of the shaft 10, or in other words, at points on the bearing surface 14 which are rotating at different peripheral speeds. As a result, the oil is caused to circulate along the bearing surfaces through the channels 16 and through the pockets 15, as indicated by the arrows in Fig. 2. The pockets 15 are preferably hermetically sealed by washers 17 of metal, formed as annular rings.

In Fig. 3, the inner ring 11 is provided with chamfers 18 or the like, which produce a suitable shape for obtaining the "Mitchell" effect. This facilitates the lubrication of the bearing surfaces.

In the modification of Fig. 4, the annular ring 13 is provided at its outer periphery with projections 19 engaging the corresponding grooves of a supporting surface. In some cases, it may be found desirable to use grooves instead of the projections 19 with corresponding projections being provided on the supporting surface.

In the embodiments of Figures 5 to 9, the inner or metal ring of Fig. 2 is shaped in such a manner that the inner and outer rings of the complete bearing are fixed, axially with respect to each other. This is done in the construction of Figures 2 and 9 by providing spherical bearing surfaces.

Figure 5:
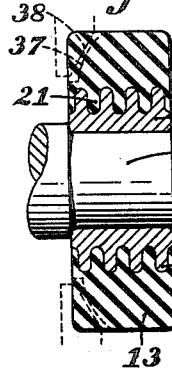
Figure 6:
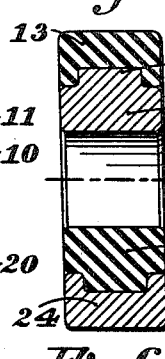
Figure 8:
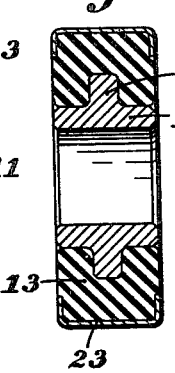

In the embodiments of Figures 5, 6, and 8, the inner ring is provided with annular projections which, during the molding operation, form corresponding recesses in the outer ring.

In the embodiment of Fig. 5, the inner ring 11 is provided with four radial protuberances 20 in the form of annular flanges which produce corresponding annular recesses 21 in the outer ring during the molding operation.

In the embodiment of Fig. 6, the inner ring 11 is provided with a wide radially extending projection 22. The embodiment according to Fig. 8 corresponds in the main to the one shown in Fig. 6, with the exception that the projection 22 of member 11 is comparatively narrow. In this last embodiment, the outer ring 13 is provided with a metal covering ring 23 of U-shaped cross-section.

Figure 6A:

In the Fig. 6a, the parts are reversed in position, that is, the inner ring 25 is formed of plastic material and the outer ring 24 of metallic material.

Figure 7:
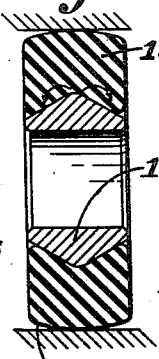

Fig. 7 shows an embodiment in which the outer bearing surface of the inner ring 11 is a conical surface of revolution with the apex of the cone equidistance from the ends of the ring.

In dotted lines in Fig. 5, a construction of the outer ring 13 and a support is shown to make the bearing assembly self aligning. This is accomplished by providing a spherical surface 37 on the outer ring 13 at one side and a conical seat 38 on the supporting surface.

Referring to Fig. 7, the outer ring 13 is formed with an outer convex surface 39 which engages a cylindrical supporting surface. The outer surfaces 37 and 39 of the outer rings 13 of Figs. 5 and 7 respectively, and the projections 19 of the ring 13, as shown in Fig. 4, are formed at the same time that the rings 13 are molded.

Figure 9:
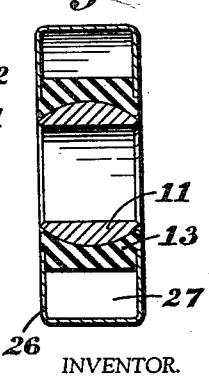

In the embodiment of Fig. 9, the inner ring 11 is provided with a spherical bearing surface which produces a self-aligning bearing around the outer ring 13, a ring 26 of metal or other suitable material, of U-shaped cross section is attached and forms a hollow annular space 27. The space 27 may be utilized for containing a lubricating material for the bearing surfaces.

In the arrangement of Fig. 1, the two parts of the bearings may be axially displaced with respect to each other. Axial displacement is not possible in connection with the embodiments of Figs. 2 and 5 to 9. With the exception of Fig. 1, the inner ring 11 and the outer ring 13 are of necessity indivisible after the outer ring is molded around the inner ring. This also applies to the construction of Fig. 6a in which the inner ring 25 is molded within the outer metal ring 24. In some instances it may be found desirable to insert into the plastic material, layers of separating material, as for example, paper or the like, prior to the molding operation, which will divide the bearing so that it may be separated after the outer ring has been molded.

The inner and outer rings, or one of them, may be made of porous material which absorbs lubricating material. The pores of this material may be filled with a lubricant or may provide passages through which lubricating material can circulate, as for example, in the manner shown by arrows in Fig. 7. In this case, as explained in connection with Fig. 2, the lubricating material travels up the bearing surface from points of lower peripheral speeds to points of higher peripheral speeds. One of the rings of the bearing may be made from a material which does not require lubrication.

Figs. 10 and 11 show an arrangement for carrying out the process of the invention. A mold 28 is provided with a bottom 29 which is formed on the end of a shaft 31. Shaft 31 is supported in a vertical position on a ball bearing 30. A plunger 32 enters through the top of the mold 28. Either the mold 28 or the plunger 32, or both, may be heated, as for example, by electric heating coils of a type well known in the art. These heating coils are not shown. In the upper end of the shaft 31, an opening 33 is located eccentric to the axis of the shaft. A crank 34 is located in an opening 33 of the shaft 31. Crank arm 36 of crank 34 extends within the mold 28. Crank arm 36 is eccentric with respect to the axis of the crank 34, as indicated by the letter E in Fig. 10. The eccentricity shown on the drawing is greatly enlarged. This eccentricity can be varied by turning the crank 34 in the opening 33. The crank 34 may be located in any desired position by means of the stop screw 35. Any axial pressure on the rotating shaft 31 is absorbed by the ball bearing 30.

In carrying out the process, according to the invention, the inner ring 11 is attached to the crank arm 36. The plastic material in the form of a powder, or perhaps a briquette of annular shape is applied around the ring 11. When the plunger 32 is pressed down into the mold 28 in contact with plastic material, the bottom 29 is simultaneously rotated. Due to the eccentricity of the crank arm 36 with respect to the axis of rotation of the shaft 31, the inner ring 11 will rotate on an axis eccentric with respect to its center line. The eccentric movement of the ring 11, during the molding of the outer ring 13, produces the desired play between the two rings. The amount of this play is determined by the eccentricity of the crank arm 36. Some play may also be obtained by a temporary film of oil located on the outer surface of ring 11 during the molding operation.

When the inner ring 11, as shown, for example, in Fig. 10, is provided with a spherical bearing surface, the completed bearing will be an indivisible unit, unless some special measures are taken to produce a divisible outer ring, as by the use of separating material as described above.

If desired, the molded ring may be formed as the inner ring instead of as the outer ring. The relative movement between the inner and outer ring during the molding operation may be produced by an axial movement or a radial movement, instead of by a rotary movement, as described above.

The invention is not limited to the embodiments shown, and described by way of example, but includes many other possible embodiments within the scope of the appended claims.

What I claim is:

1. The method of manufacturing a sleeve bearing which includes molding a bearing ring element of non-metallic material around an inner metallic ring which is to comprise the inner element of the finished bearing, and imparting a relative rotary motion to the inner and outer rings during the molding operation to produce clearance between the elements in the completed bearing.

2. The method of manufacturing a sleeve bearing which includes molding an outer bearing ring element of non-metallic material around an inner metallic ring which is to comprise the inner element of the finishel bearing, and rotating the inner metallic ring on an axis eccentric to the axis of the rings during the molding operation to produce clearance between the elements in the completed bearing.

3. The method of manufacturing a sleeve bearing which includes molding a bearing ring element of non-metallic material on a ring of metallic material which is to comprise the other element of the finished bearing, and imparting a relative motion between the two rings during the molding operation to produce a play between the two rings in the completed bearing.

4. The method of manufacturing a sleeve bearing which comprises molding an outer bearing ring element of non-metallic material by the application of heat and pressure around an inner ring of metallic material which is to comprise the inner element of the finished bearing, and rotating the inner metallic ring on an axis eccentric to the axis of the non-metallic ring during the molding operation to produce clearance between the elements in the completed bearing.

5. The method of manufacturing a sleeve bearing which consists in molding an outer bearing ring element of non-metallic material by the application of heat and pressure around an inner metallic ring which is to comprise the inner element of the finished bearing, and producing relative radial movement between the two rings during the molding operation to compress the non-metallic material of the outer ring and to produce clearance between the elements in the completed bearing.

6. The method of manufacturing a sleeve bearing which comprises forming a non-metallic bearing ring element by pressure casting the ring on a metallic ring which is to comprise the other element of the finished bearing, and producing a relative transverse movement between the two rings during the casting operation to produce clearance between the elements in the completed bearing.

7. The method of manufacturing a sleeve bearing which comprises placing a metal ring which is to comprise one element of the finished bearing in a mold, placing layers of separating material on the ring, inserting a powdered moldable material in the mold, applying heat and pressure to the powdered material to mold it on the metal ring to form the other element of the finished bearing, rotating the metal ring during the application of pressure and removing the layers of separating material to separate the two rings.

8. The method of manufacturing a sleeve bearing which comprises placing a metallic ring which is to comprise the inner element of the finished bearing on a rotatable member located within a mold, placing powdered material in the mold around the ring, applying heat and pressure to the powdered material to mold it on the metal ring to form the outer element of the finished bearing, and rotating the ring simultaneously with the application of heat and pressure to the powdered material.

9. An apparatus for the manufacturing of sleeve bearings including a mold having a rotatable bottom wall, a shaft connected for rotating said bottom wall and having an axial opening, a crank located in said opening and having an eccentric crank arm extending into said mold, said crank arm being adapted to receive a metal ring, and a plunger adapted to enter said mold and compress powdered material around said ring.

10. An apparatus for the manufacturing of sleeve bearings including a mold having a rotatable bottom wall, a shaft connected for rotating said bottom wall and having an eccentrically located opening, a crank located in said opening and having an eccentric crank arm extending within said mold, said crank arm being adapted to receive a metal ring, a plunger adapted to enter said mold for compressing powdered material around said ring, and means for rotating said shaft.

11. The method of manufacturing a bearing which comprises molding a bearing ring element of non-metallic material, by the application of heat and pressure on a ring of metallic material which is to comprise the other element of the finished bearing, rotating the ring of metallic material during the application of pressure and providing a temporary coating of oil on the surface of the metallic ring, during the molding operation to produce a play between the metallic and non-metallic ring, upon the completion of the bearing.

TORD ERIK DANIEL BILDE.